United States Patent [19]

Duren et al.

[11] Patent Number: 5,384,752
[45] Date of Patent: Jan. 24, 1995

[54] METHOD FOR CORRECTING A SEISMIC SOURCE PULSE WAVEFORM

[75] Inventors: Richard E. Duren, Spring; Kenneth D. Andersen, Kingwood, both of Tex.

[73] Assignee: Exxon Production Research Company, Houston, Tex.

[21] Appl. No.: 43,267

[22] Filed: Apr. 6, 1993

[51] Int. Cl.⁶ ............................ G01V 1/28; G01V 1/36
[52] U.S. Cl. ................................... 367/38; 367/24; 367/46; 364/421
[58] Field of Search ..................... 367/15, 21, 23, 24, 367/46, 43; 364/421

[56] References Cited

U.S. PATENT DOCUMENTS

| | | | |
|---|---|---|---|
| 4,500,978 | 2/1985 | Ziolkowski et al. | 367/142 |
| 4,646,274 | 2/1987 | Martinez | 367/41 |
| 4,721,180 | 1/1988 | Haughland et al. | |
| 5,173,880 | 12/1992 | Duren et al. | 367/21 |

OTHER PUBLICATIONS

Durent R. E.; Geophysics, vol. 56, #7, pp. 1015–1026, Jul. 1991; abst. only supplied herewith.
Duren, R. E.; 60th Annu. Seg. Int. Mtg., Sep. 27, 1990, p. No. 5024; vol. 2, pp. 1495–1498; abst. only provided.
Javanovich et al; Geophysics, vol. 48, #11, 1983, pp. 1468–1485; abst. only provded.
Malliu et al; Soviet Geology and Geophysics, vol. 29, #6, 1988, pp. 103–110; abst. only herewith.

*Primary Examiner*—Nelson Moskowitz
*Attorney, Agent, or Firm*—Pravel, Hewitt, Kimball & Krieger

[57] ABSTRACT

A method of correcting a seismic pulse waveform for use in deconvolution of reflected pulse data. The source pulse waveform is measured by a hydrophone positioned vertically beneath the acoustic source. The phase error is calculated based on the depth of the source and the depth of the measuring hydrophone. The calculated error is subtracted from the phase spectrum of the measured waveform. The resulting waveform provides an accurate representation of the true far field waveform, leading to an improved expression of the waveform actually incident upon the marine floor.

16 Claims, 4 Drawing Sheets

METHOD FOR CORRECTING A SEISMIC SOURCE PULSE WAVEFORM

BACKGROUND OF THE INVENTION

1. Field of the Invention

The invention relates to seismic exploration, and more particularly to deterministic methods of analyzing and processing seismic data using a source pulse waveform.

2. Description of the Related Art

Generally, the oil and gas industry developed seismic exploration to determine the location and character of subterranean geological formations. Seismic exploration is not limited merely to land, however, but is also widely applied to find mineral deposits in submarine geological formations. Using the data acquired from seismic exploration, an analyst may construct a model of the submarine geology and determine potential mineral deposit locations.

To explore submarine geological formations, an exploration vessel tows an acoustic source through the water. A variety of acoustic sources are available, including air guns, water guns, and marine vibrators. The acoustic source emits acoustic pulses, or pressure pulses, at selected locations or intervals. The pressure pulse propagates through the water to the marine floor. When the pressure pulse strikes the water/earth interface at the bottom, part of the energy of the pulse is transmitted into the geological formation and part is reflected upward into the water. As the energy from the transmitted part of the pulse propagates downward through the geological formation, the pulse encounters boundaries where the physical characteristics of the geological formation changes due to sedimentary layering or other geological phenomena. Because of the acoustic impedance of the boundary, part of the energy of the propagated pulse is reflected upwards from each boundary towards the surface. Sensors on the surface detect the energy of the reflected pulses. The sensors are commonly drawn by the vessel towing the acoustic source, or may be drawn by separate vessels. The sensors record the reflected pulses, and the various characteristics of the data are later analyzed to determine the attributes of the submarine formation.

Geophysicists and geologists analyze seismic exploration data from the reflected pulses with a variety of methods. The practicality and reliability of the techniques vary widely, and each involves certain advantages and disadvantages. Consequently, the data analyst's preferences and experience typically determine which data analysis technique is applied. Most data analysis techniques, however, rely upon a convolutional model of the seismogram. Generally, the reflected waves detected by the exploration vessel may be expressed as a convolution function, dependent upon a time function of the source pulse convolved with an impulse response function characteristic of the structure of the geological formation. In the convolution model, the source pulse function and the geologically characteristic function are independent and separate. Thus, the detected waveform may be deconvolved to separate the source pulse function from the geologically characteristic function. Subsequent analysis of the geologically characteristic function then indicates the features and characteristics of the submarine formation.

Because the deconvolution process requires separation of the source pulse function to establish the geologically characteristic function, the results of the deconvolution process are only as accurate as the function expressing the source pulse. As discussed by A. Ziolkowski in an article entitled *Why Don't We Measure Seismic Signatures?* (*Geophysics*, Vol. 56, No. 2, Feb. 1991, pp. 190-201), which is hereby incorporated by reference, several problems are associated with source pulse deconvolution in the prior art. In general, deconvolution methods may be separated into statistical and deterministic methods. Statistical deconvolution methods commonly estimate a wavelet from the seismic data. The wavelet is a model seismic pulse, usually composed of one or two cycles. The estimated wavelet is then applied to the deconvolution process to derive the geologically characteristic function. Although the methods of estimating a wavelet are numerous, none bases the wavelet estimate on actual measurement of the source pulse waveform. Instead, the wavelet function depends on assumptions and guesses relied upon by the analyst to estimate the wavelet from the reflected pulse data. Consequently, determination of the wavelet depends not upon an objective test, but the subjective judgment of the interpreter of the data. As indicated by Ziolkowski (pp. 193-95), estimating the wavelet using statistical methods relies on a combination of assumptions about the properties of the source pulse and the geology that bear little or no theoretical justification.

Because the source pulse function derived from the estimated wavelet is inaccurate, the deconvolution process cannot determine an accurate impulse response function for the geological formation. When the reflected pulse function is deconvolved using the deflective source pulse function, the result is an erroneous impulse response function of only marginal accuracy. Conclusions drawn from the resulting function regarding the underground formation are at best imperfect, and costly as well.

Because of the shortcomings of the statistical data analysis methods, deterministic methods are generally recognized as superior methods of analyzing seismic data. Deterministic methods involve directly measuring the waveform of the source pulse. Thus, when the reflected pulse data is received, the known source pulse function may be effectively deconvolved from the data to determine the geologically characteristic function.

In the marine environment, the source pulse function may be determined using a hydrophone towed directly beneath the source. When the source emits an acoustic pulse, the hydrophone records the waveform of the pulse as it propagates through the water. The analyst then uses the measured waveform in the deconvolution process to separate the source pulse from the reflected wave and determine the geologically characteristic function. Generally, the waveform recorded by the hydrophone is directly applied to the convolution process without substantive alteration.

Although this method uses a source pulse function that is based on the actual pulse instead of an estimated wavelet, the source pulse function generated by the measuring hydrophone is not an accurate expression of the source pulse generating the reflected waves. The waveform received by the measuring hydrophone is not identical to the waveform received at the distant bottom. In deep water, the far field waveform for the pulse approximates the waveform received at the bottom. The hydrophone, however, is much closer to the source array than the floor, so that the hydrophone does not record the far field waveform. The disparity exists because the depth of the source is sufficiently significant in relation to the distance of the hydrophone from the source that the waveform measured by the hydrophone differs from the far field waveform. The difference of distances generates a difference of phase spectra for the two waveforms. Therefore, when the measured source pulse waveform is applied to the deconvolution process for the reflected pulse, the deconvolution process applies a waveform that does not accurately correspond to the waveform that generated the reflected pulses. Consequently, any results derived from the reflected pulses are likely to be imprecise and inaccurate.

The disparity between the phase spectra of the measured pulse and the far field pulse is proportional to the difference between the distance from the source to the measuring hydrophone and from the source to the marine floor. Consequently, the further the hydrophone is placed from the source, the more accurately the hydrophone measures the waveform actually incident upon the marine floor. Unfortunately, technical and practical considerations limit the distance the hydrophone may be placed from the source. Thus, the phase spectrum measured at the hydrophone always includes an error which degrades the data.

SUMMARY OF THE PRESENT INVENTION

Briefly, the present invention eliminates the disparity between the measured waveform and the far field waveform and provides a corrected source pulse waveform. The disparity is removed by measuring the source pulse waveform in the conventional manner, calculating the waveform disparity according to the depth of the array and the distance between the ocean surface and the measuring hydrophone, and subtracting the calculated error from the phase spectrum associated with the measured pulse. The resulting waveform is an accurate representation of the far field waveform, which is an improved expression of the waveform actually incident upon the marine floor.

When the deconvolution process is performed on the pulses reflected by the subterranean formation, the analyst applies the revised waveform to the deconvolution process. Because the revised waveform does not include the error present in the measured source pulse waveform, the deconvolution process more accurately separates the source pulse function and the geologically characteristic function. Thus, an accurate geologically characteristic function may be derived from the data, leading to an accurate model of the geological formation.

BRIEF DESCRIPTION OF THE DRAWINGS

A better understanding of the present invention can be obtained when the following detailed description of the preferred embodiment is considered in conjunction with the following drawings, in which.

DETAILED DESCRIPTION OF THE PREFERRED EMBODIMENT

Figure 1:
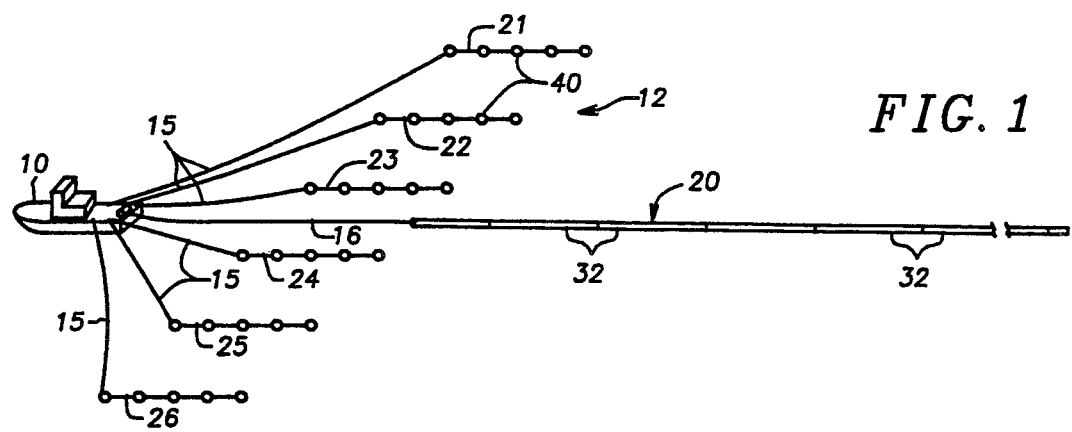
FIG. 1 illustrates a seismic exploration vessel towing an acoustic source array and a seismic cable.
Figure 2:
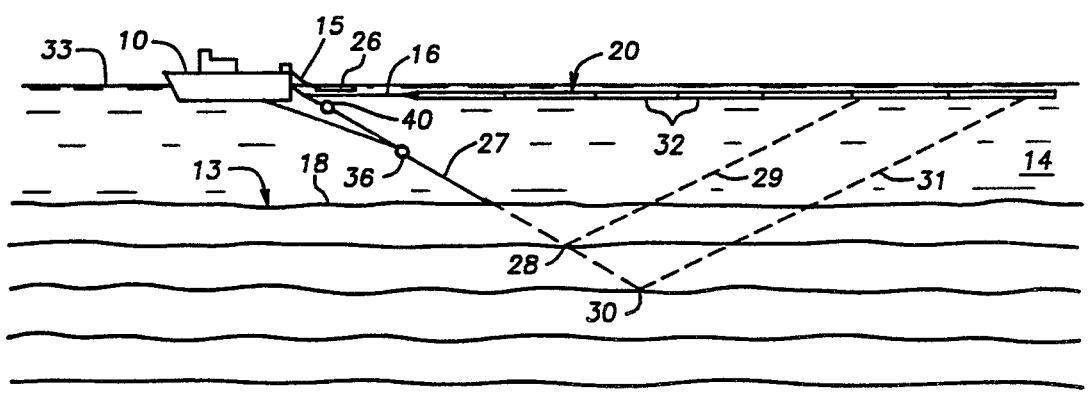
FIG. 2 is a side view of the vessel of FIG. 1, also showing a cross-section of a body of water and a geological formation.

FIG. 1 depicts a typical seismic exploration vessel 10 towing an acoustic source 12. A side view of the vessel 10 showing the water 14 and a portion of the submarine geologic formation 13 is shown in FIG. 2. The acoustic source 12 illustrated in FIG. 1 is a seismic array having multiple source elements 40, consisting of six subarrays 21-26 connected by cables 15 to the vessel 10. Each subarray 21-26 includes multiple individual seismic elements 40. Each seismic element 40 may be any type of source, like an air gun, water gun, or marine vibrator, and an acoustic array is often a combination of several elements. The design and operation of seismic source arrays are well known to those skilled in the art. It would be appreciated by one skilled in the art, however, that the methods of the present invention may be applied in conjunction with any type of acoustic source. In the preferred embodiment, the source array is a controlled phase array so that the phase spectrum of the pulse is identical in any direction of interest. Controlled phase arrays are described in U.S. patent application Ser. No. 07/751,295 filed Aug. 28, 1989 by Duren, which is hereby incorporated by reference.

Referring now to FIG. 2, conventional marine geophysical exploration relies upon reflections of acoustic pulses from geological formations and detection on the surface. As the vessel 10 moves through the water 14, the acoustic source 12 emits pressure pulses at specific intervals and locations. The acoustic source 12 moves through the water 14 at a constant depth d. Only one element of the source array is illustrated in FIG. 2 for clarity. When the source pulse is emitted, it propagates in all directions, including towards the water surface 33. The emitted pulse has a frequency spectrum with a fundamental frequency and multiples that are related to the type of source element emitting the pulse and the source's depth. When the pulse strikes the water/air interface at the surface 33 of the water 14, a significant fraction of the pulse's energy is reflected downward into the water 14. The energy reflected from the water/air interface propagates through the water 14 behind the original source pulse, and is commonly referred to as a ghost pulse. Both the phase and amplitude spectra of the source pulse are affected by the ghost pulse. Because the ghost pulse is reflected from the surface 33, the ghost pulse's phase is shifted 180° with respect to the source pulse's phase. The ghost pulse presents a significant consideration in seismic exploration, and therefore must be accommodated in the source pulse function.

As the source pulse and ghost pulse propagate through the water 14, the waveform is recorded by a deep tow hydrophone 36. The hydrophone 36 is shown in FIG. 2 well behind the vessel 10 because of space limitations of the drawing which place the marine floor near the vessel 10. In actual applications, the marine floor is far below the vessel 10, and the hydrophone 36 is positioned directly under the geometric centroid of the source array 12. The hydrophone 36 is normally located 100-200 meters below the surface 33. The data received by the hydrophone 36 allows the source pulse to be recorded.

Beyond the hydrophone 36, the source pulse propagates to the bottom 18 of the body of water 14. At the earth/water interface of the marine floor 18, some of the energy of the incident pulse is reflected upwards towards the surface 33. Another fraction of the energy, on the other hand, is transmitted into the geological formation 13 and propagates downward. Boundaries 28 and 30 represent interfaces where geological strata having different physical characteristics meet. The change of the earth's physical characteristics creates a significant discontinuity of the geological formation's 13 acoustic impedance. Thus, as the pressure pulse encounters each boundary 28, 30, a portion of the pressure pulse's remaining energy 29, 31 is reflected towards the surface 33 of the water 14, while another fraction is transmitted past the boundary 28, 30 and continues to propagate downward. As the source pulse propagates through the geological formation 13, the characteristics of the geological formation 13 affect various aspects of the pulse, like the pulse's propagation velocity, amplitude, and phase. The exact effect upon the source pulse depends upon the various characteristics of the geological formation 13.

The reflected waves propagate upward through the water 14 and a portion of the energy is detected by a seismic line 20 having sensors sensitive to the reflected pulses. The seismic line 20 is generally composed of sections 32, and is towed by the exploration vessel 10 in a straight line. The seismic line 20 converts detected pulses into electrical signals and records the reflected pulse data from the geological formation 13 beneath the water 14. The recorded data are stored for later analysis.

After the reflected pulse data are collected, they are analyzed to determine the particular geological formation 13 from which the pulse data returned. As discussed in the Ziolkowski article (p. 191), the reflected wave may be analyzed as the convolution of two separate time functions. The first time function is the waveform of the source pulse as a function of time as it is received at the earth/water interface 18 on the marine floor 18. The other time function is the impulse response of the geological formation 13. Various characteristics of the geological formation 13 determine the impulse response, including density, composition, uniformity, and thickness. Thus, a considerable amount of information regarding the geological formation 13 may be obtained by determining the formation's impulse response function from the reflected pulse.

The reflected wave detected by the seismic cable 0 may be represented as follows:

$$p_{sr}(t) = s_s(t) * g_{sr}(t) \quad (1)$$

where $p_{sr}(t)$ is the pressure of the reflected wave as a function of time, $s_s(t)$ is the time function of the source pulse in units of pressure times distance, and $g_{sr}(t)$ is the impulse response of the geological formation 13 at the same receiver and source positions in units of pressure times distance. The subscripts "s" and "r" indicate dependence on the source and receiver positions, respectively. The asterisk (*) denotes convolution of the two time functions. Thus, to determine the impulse response of the geological formation 13 from the reflected waveform, the data must be deconvolved to separate the source pulse waveform from the reflected waveform and establish the impulse response of the geological formation 13.

Figure 3:
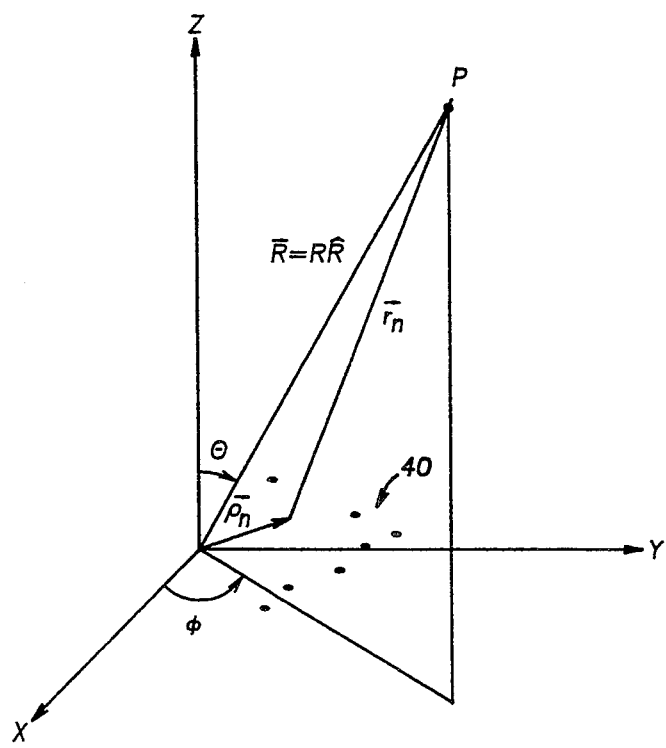
FIG. 3 depicts a Cartesian coordinate system with an acoustic source array and an observation point.

To accurately perform the deconvolution, the waveform of the source pulse applied to the deconvolution process must be accurate. Referring now to FIG. 3, a Cartesian coordinate system is illustrated. The coordinate system's origin coincides with the surface of the water 33 directly above the geometric centroid of an acoustic source array 40. The three-dimensional array is composed of N acoustic source elements 40 below the water surface 33. The Z axis is directed into the water 14 toward the marine floor 18. An observation point P is also illustrated below the water surface 33. As indicated in an article entitled *A Theory for Marine Source Arrays*, by Richard E. Duren (*Geophysics*, Vol. 53, No. 5, May 1988, pp. 650–658), which is hereby incorporated by reference, the pressure waveform radiated by a source array 12 having N elements, fired at t=0, and propagated through a homogeneous medium, may be represented as follows:

$$P(R,t) = \int_{-\infty}^{+\infty} df \sum_{n=1}^{2N} A_n(f) \frac{\exp[i(2\pi ft - kr_n)]}{r_n} \quad (2)$$

In Equation 2, $r_n$ is the radial distance from the nth source array element to the observation point P, t is time, f is frequency, k is the wave number, $A_n(f)$ is the frequency spectrum of the waveform radiated by the nth element, and R is the position vector of the observation point. The wave number k is a function of frequency and propagation velocity in the medium so that $k = \pi f/v$ where v is the propagation velocity. Although several of the following equations are functions of frequency, many only include the wave number k to simplify the notation, and do not show the longer term having the frequency f term. The summation over twice the number N of actual source elements 40 accounts for the ghost pulse of each element 40. When position vector $\rho_n$ specifies the location of the nth element 40 of the source array 12, $r_n$ may be written in terms of $\rho_n$ and R which generates an expression including a square root term. When the square root term is expanded and the higher order terms are eliminated, $r_n$ may be expressed as follows:

$$r_n \simeq R \left[ 1 - \frac{\hat{R} \cdot \rho_n}{R} - \frac{(\hat{R} \cdot \rho_n^2)}{2R^2} + \frac{\rho_n^2}{2R^2} \right] \quad (3)$$

This expression of $r_n$ may then be substituted into Equation 2, which yields:

$$P(R, t) \simeq \int_{-\infty}^{+\infty} \frac{\exp[i(2\pi ft - kR)]}{R} df \sum_{n=1}^{2N} A_n(f) \cdot \frac{\exp\left\{ -ikR \left[ \frac{-\hat{R} \cdot \rho_n}{R} \left( 1 + \frac{\hat{R} \cdot \rho_n}{2R} \right) + \frac{\rho_n^2}{2R^2} \right] \right\}}{1 - \frac{\hat{R} \cdot \rho_n}{R} \left( 1 + \frac{\hat{R} \cdot \rho_n}{2R} \right) + \frac{\rho_n^2}{2R^2}} \quad (4)$$

Equation 4 may be rewritten as follows:

$$P(R, t) = \int_{-\infty}^{+\infty} \frac{\exp[i(2\pi ft - kR)]}{R} df A(\theta, \phi, f) \quad (5)$$

where $$A(\theta,\phi,f) = \qquad (6)$$

$$\sum_{n=1}^{2N} A_n(f) \frac{\exp\left[ik\hat{R}\cdot\rho_n\left(1 + \frac{\hat{R}\cdot\rho_n}{2R} - \frac{\rho_n^2}{2R(\hat{R}\cdot\rho_n)}\right)\right]}{1 - \frac{\hat{R}-\rho_n}{R}\left[1 + \frac{\hat{R}\cdot\rho_n}{2R} - \frac{\rho_n^2}{2R(\hat{R}\cdot\rho_n)}\right]}$$

$A(\theta, \phi, f)$ is the frequency spectrum of the source pulse waveform as a function of the direction to the observation point and frequency. $\theta$ and $\phi$ determine the unit vector $\hat{R}$, as shown in FIG. 3. If the size of the source array 12 is small and the hydrophone 36 is placed at a distant position relative to the source array 12, the magnitude of $\rho_n$ is much less than R. This condition is generally true for a compact source array 12 and a deep tow hydrophone 36. Consequently, Equation 6 may be written as:

$$A(\theta,\phi,f) = \qquad (7)$$

$$\sum_{n=1}^{2N} A_n(f)\left[1 + \frac{\hat{R}\cdot\rho_n}{R}\left(1 + \frac{\hat{R}\cdot\rho_n}{2R} - \frac{\rho_n^2}{2R(\hat{R}\cdot\rho_n)}\right)\right] \cdot$$

$$\exp\left[ik\hat{R}\cdot\rho_n\left(1 + \frac{\hat{R}\cdot\rho_n}{2R} - \frac{\rho_n^2}{2R(\hat{R}\cdot\rho_n)}\right)\right]$$

The relevant observation point in the preferred embodiment is the position of the hydrophone 36, directly below the source array 12, so that $\theta \approx \phi \approx 0$. Because the relevant observation point of the hydrophone 36 is positioned beneath the source 12 and is relatively distant from the source 12, the dot product of $\rho_n$ and the unit vector $\hat{R}$ is approximately the depth d of the source 12. The ghost pulse, on the other hand, appears to the hydrophone 36 observation point P as if the ghost pulse were emitted by a source at distance d above the surface 33 of the water 14. Thus:

$$\hat{R}\cdot\rho_n = d \text{ for } n \leq N \quad \rho_n = \hat{x}x_n + \hat{y}y_n + \hat{z}d \qquad (8)$$
$$\hat{R}\cdot\rho_n = -d \text{ for } n > N \quad \rho_n = \hat{x}x_n + \hat{y}y_n - \hat{z}d$$

The proper dot products are then substituted into Equation 7. The downward going pulse phase spectrum is then characterized by the following equation:

$$A(0,0,f) \approx \sum_{n=1}^{N} A_n(f)\left\{1 + \frac{d}{R}\left[1 + \frac{d}{2R} - \frac{\rho_n^2}{2Rd}\right]\right\} \cdot \qquad (9)$$

$$\exp\left\{ikd\left[1 + \frac{d}{2R} - \frac{\rho_n^2}{2Rd}\right]\right\} -$$

$$\sum_{n=1}^{N} A_n(f)\left\{1 - \frac{d}{R}\left[1 - \frac{d}{2R} + \frac{\rho_n^2}{2Rd}\right]\right\} \cdot$$

$$\exp\left\{-ikd\left[1 - \frac{d}{2R} + \frac{\rho_n^2}{2Rd}\right]\right\}$$

The second term is subtracted due to the 180° phase shift caused by the ghost pulse's reflection from the surface of the water. Then, substituting for $\rho_n$ in terms of $x_n$, $y_n$, and d in Equation 9 produces the following:

$$A(0,0,f) \approx \qquad (10)$$

$$\sum_{n=1}^{N} A_n(f)\left\{1 + \frac{d}{R}\left[1 - \frac{x_n^2 + y_n^2}{2Rd}\right]\right\}\exp\left\{ikd\left[1 - \frac{x_n^2 + y_n^2}{2Rd}\right]\right\} - \sum_{n=1}^{N} A_n(f)\left\{1 - \frac{d}{R}\left[1 + \frac{x_n^2 + y_n^2}{2Rd}\right]\right\}\exp\left\{-ikd\left[1 + \frac{x_n^2 + y_n^2}{2Rd}\right]\right\}$$

For a compact source array 12, $x_n$ and $y_n$ are very small relative to the depth of the hydrophone 36, the marine floor 18, or any other relevant observation point. Thus, the following is also required:

$$\frac{x_n^2 + y_N^2}{2Rd} << 1 \qquad (11)$$

Consequently, by applying Equation 11, Equation 10 reduces to:

$$A(0,0,f) \approx \sum_{n=1}^{N} A_n(f)\left[1 + \frac{d}{R}\right]\exp(ikd) - \qquad (12)$$

$$\sum_{n=1}^{N} A_n(f)\left[1 - \frac{d}{R}\right]\exp(-ikd)$$

Equation 12 may be rearranged and, by application of Euler's equation, the exponent term substituted to produce:

$$A(0,0,f) \approx \sum_{n=1}^{N} A_n(f) \cdot \qquad (13)$$

$$\left[\left(1 + \frac{d}{R}\right)(\cos kd + i \sin kd) - \left(1 - \frac{d}{R}\right)(\cos kd - i \sin kd)\right]$$

When the factors are multiplied and the terms added, Equation 13 reduces to:

$$A(0,0,f) \approx \left[\frac{2d}{R}\cos kd + 2i \sin kd\right]\sum_{n=1}^{N} A_n(f) \qquad (14)$$

for the frequency spectrum of the downgoing pulse recorded by the hydrophone 36.

As the source pulse propagates downward to the marine floor 18, R becomes very large with respect to d, the depth of the source array 12. As R increases, the significance of the cosine term diminishes. Consequently, the far field frequency spectrum may be expressed by the following equation:

$$A_{ff}(0,0,f) \simeq 2i \sin kd \sum_{n=1}^{N} A_n(f) \quad (15)$$

The frequency spectrum of the source pulse as it is received at the marine floor 18 is approximately equivalent to the far field frequency spectrum expressed by Equation 15. The recorded frequency spectrum of the wave recorded by the hydrophone 36, on the other hand, is defined by Equation 14. The phase spectrum component of the frequency spectrum may be expressed as follows for Equations 14 and 15, respectively:

$$\phi_m = \arcsin\left[\frac{\sin kd}{\sqrt{\left(\frac{d}{R}\right)^2 \cos^2 kd + \sin^2 kd}}\right] \quad (16)$$

$$\phi_{ff} = \arcsin[\text{sgn}(\sin kd)] \quad (17)$$

where $\Phi_m$ is the phase spectrum of the measured waveform, $\Phi_{ff}$ is the phase spectrum of the far field waveform, and the sgn function determines only the sign of the term in parentheses, so that:

$$\text{sgn}(x) = \frac{x}{|x|} \quad (18)$$

Comparison of Equations 16 and 17 indicates that the measured phase spectrum includes a phase error relative to the far field phase spectrum. The phase error creates a different waveform for the measured pulse compared to the far field waveform. Thus, when the measured waveform is used in the deconvolution process, the measured waveform includes a phase error which degrades the accuracy of the waveform deconvolution. The accuracy of the resulting impulse response function for the geological formation 13 diminishes, and models drawn from the results are relatively uncertain and inconclusive.

Figure 4:
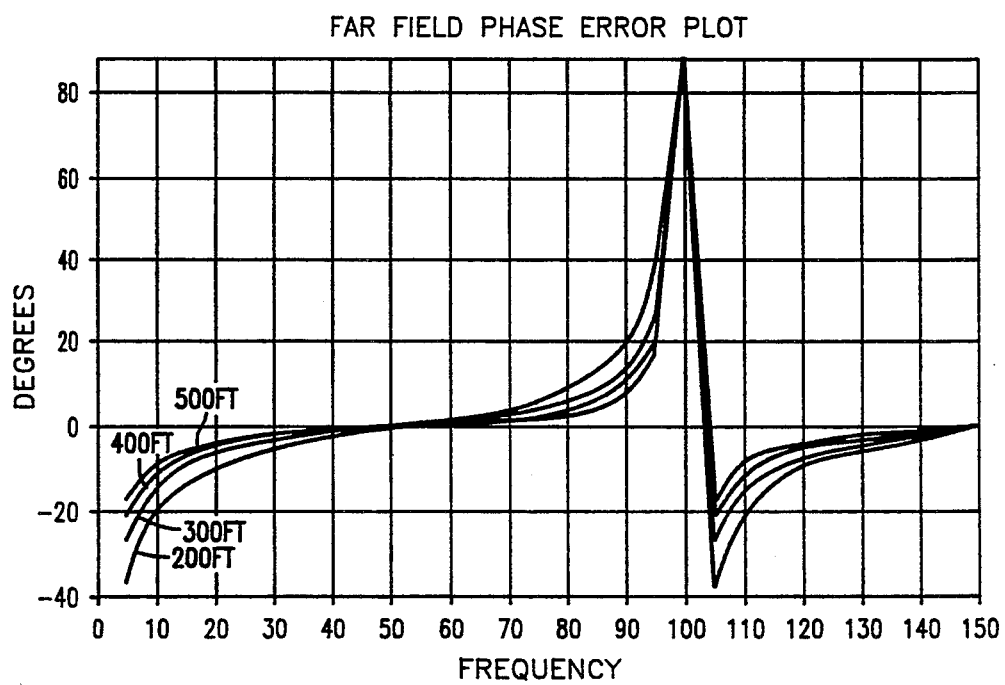
FIG. 4 is a plot of a far field phase error at different distances from the source.

FIG. 4 illustrates the phase error between the true far field phase spectrum for a pulse, and the phase spectrum of the pulse measured at 100 foot intervals from 200 to 500 feet. The source depth for the pulse is 25 feet. Even at a measuring depth of 500 feet, a significant phase error exists.

Figure 5:
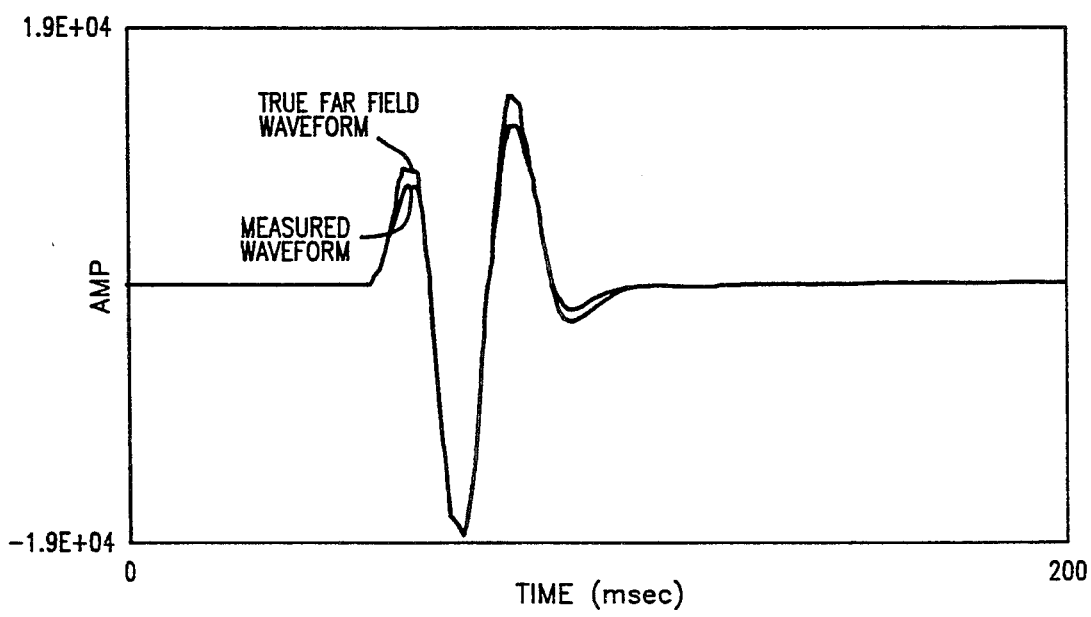
FIG. 5 is a plot of a true far field waveform and an uncorrected measured waveform.

The phase error affects the shape of the waveform as it is measured compared to the true far field waveform. FIG. 5 depicts a waveform generated by a source at a depth of 25 feet as it is measured at a depth of 100 feet and the same waveform measured at a depth of 4,000 feet. The error in the phase spectrum generates a different waveform at 100 feet than the waveform measured at 4,000 feet for the same source excitation. If the bottom is at 4,000 feet, then the reflected pulse may be represented as the convolution of the pulse at 4,000 feet. Consequently, when the waveform measured at 100 feet is used in the deconvolution process, the deconvolution results are distorted due to the disparity between the waveform measured and used in the deconvolution process, and the waveform actually incident upon the marine floor at 4,000 feet which generated the reflected pulses. Consequently, the results of the deconvolution are distorted, and the resulting data are inaccurate.

Figure 6:
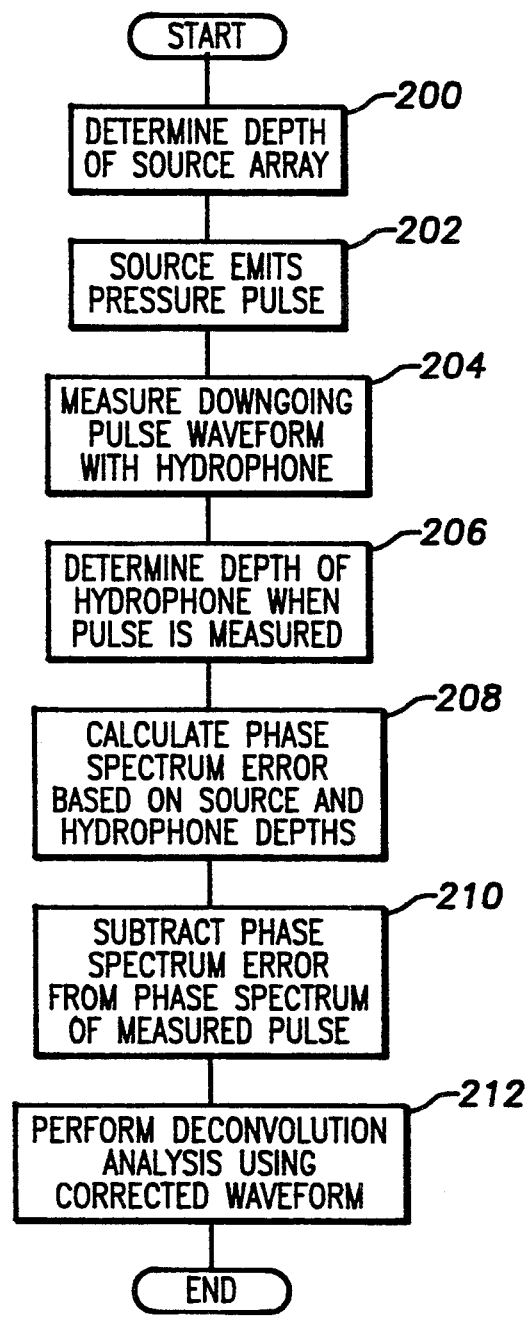
FIG. 6 is a flowchart of a method according to the present invention.

A seismic exploration system according to the present invention corrects the measured waveform to generate a more accurate representation of the waveform actually incident at the marine floor. An exploration system according to the present invention corrects the recorded source waveform so that the true far field waveform is used in the deconvolution process. A flowchart shown in FIG. 6 illustrates a method of correcting the source pulse waveform according to the present invention. In step 200, the depth of the source 12 is determined. After the depth of the source 12 is determined, the source 12 emits a pressure pulse in step 202. In step 204, conventional means, like a deep tow hydrophone, measures the source pulse waveform as it propagates. The relative position of the hydrophone 36 is determined in step 206 at substantially the same time as the source pulse is recorded by the hydrophone according to the travel time required for the pulse to pass the hydrophone 36. The source pulse then propagates through the water to the geological formation, and the reflected pulses are conventionally recorded by a seismic line.

Before the deconvolution process is performed, however, the phase error is calculated in step 208. The phase error is represented by the difference between equations 16 and 17 and is thus calculated according to the Equation:

$$A_{PSE}(0,0,f) = \quad (19)$$

$$\arccos\left[\frac{\left(\frac{d}{R}\right)\cos\left(\frac{2\pi f d}{v}\right)}{\sqrt{\left(\frac{d}{R}\right)^2 \cos^2\left(\frac{2\pi f d}{v}\right) + \sin^2\left(\frac{2\pi f d}{v}\right)}}\right] \cdot$$

$$\text{sgn}\left[\sin\left(\frac{2\pi f d}{v}\right)\right] - \arcsin\left\{\text{sgn}\left[\sin\left(\frac{2\pi f d}{v}\right)\right]\right\}$$

where v is the acoustic propagation velocity in the body of water and $A_{PSE}(0,0,f)$ is the phase error included in the measurement of the downgoing pulse. It should be further noted that the wave number k has been replaced by its equivalent expression, $2\pi f/v$, to clarify the phase error's dependence on frequency. Because the depth of the array and the relative location of the hydrophone are known, this phase error may be accurately calculated. The calculated phase error is then subtracted from that associated with the measured waveform in step 210. This operation produces a waveform having the far field frequency spectrum represented by Equation 15. The corrected waveform is then used in step 212 to perform the deconvolution process in a conventional manner to determine the impulse response of the geological formation.

Figure 7:
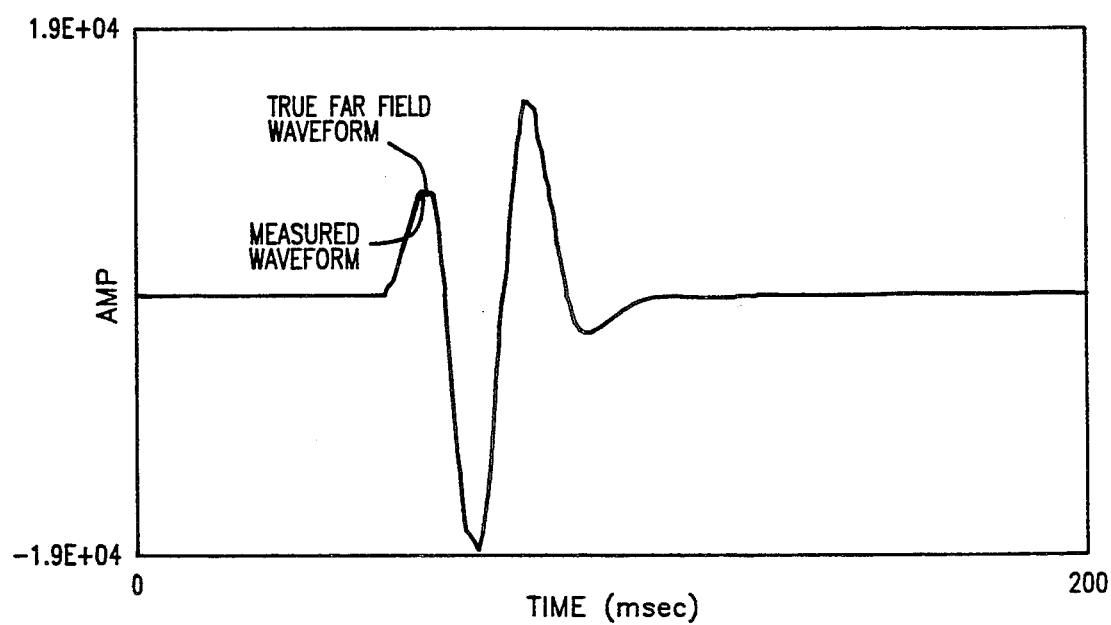
FIG. 7 is a plot of a true far field waveform and a corrected measured waveform.

The results of this correction are depicted in FIG. 7. FIG. 7 illustrates the waveform of FIG. 5 at 4,000 feet and the waveform measured at 100 feet after phase correction. As indicated by FIG. 7, the waveforms are nearly identical. Thus, the corrected waveform provides a more accurate model of the waveform actually generating the reflected pulse, and therefore produces more accurate results from the reflected waveform data.

When the corrected source pulse waveform is used to deconvolve the reflected pulse data, a more accurate impulse response function of the geological formation may be generated. The results of the deconvolution are only as accurate as the source pulse waveform. By removing the phase error, a deconvolution process according to the present invention more accurately approximates the waveform that actually generated the reflected pulses. Consequently, when the reflected pulse data is deconvolved to remove the source pulse function and determine the impulse response function, the proper source pulse function is used and the impulse response function is more accurately defined. Consequently, the results and conclusions drawn from the data are superior to those derived from conventional methods.

The foregoing disclosure and description of the invention are illustrative and explanatory, and various changes in the materials, components, operations, and details of the illustrated equipment and operations, may be made without departing from the spirit of the invention.

I claim:

1. A method of seismically exploring a geological formation beneath a body of water, comprising the steps of:
   emitting a pulse from a source into the body of water towards the geological formation to produce reflected pulses from within the geological formation;
   determining a source depth position of said source relative to an upper surface of said body of water;
   measuring a waveform of said source pulse at a measuring position in the body of water;
   recording waveforms of pulses reflected from the geological formation;
   adjusting said measured source pulse waveform to compensate for phase errors therein, wherein said step of adjusting includes the steps of:
      determining a phase spectrum error based upon said source depth position and the distance between said source pulse waveform measuring position and said source depth position by performing the steps of:
         determining a distance between said measuring position in the body of water and said upper surface of the body of water; and
         determining a phase spectrum error for said measured source pulse waveform according to the equation:

$$A_{PSE}(0,0,f) = \arccos\left[\frac{\left(\frac{d}{R}\right)\cos\left(\frac{2\pi fd}{v}\right)}{\sqrt{\left(\frac{d}{R}\right)^2 \cos^2\left(\frac{2\pi fd}{v}\right) + \sin^2\left(\frac{2\pi fd}{v}\right)}}\right].$$

$$\text{sgn}\left[\sin\left(\frac{2\pi fd}{v}\right)\right] - \arcsin\left\{\text{sgn}\left[\sin\left(\frac{2\pi fd}{v}\right)\right]\right\}$$

where $A_{PSE}(0,0,f)$ is said phase error, d is said source depth position, R is said distance between said measuring position in the body of water and said surface of the body of water, and f is the frequency and v the velocity of the downgoing acoustic pulse; and
   subtracting the determined phase spectrum error from said source pulse waveform measured at the measuring position; [and]
   convolving the adjusted measured source pulse waveform with the recorded waveforms reflected from the geological formation; and
   forming a corrected display of the waveforms from the geological formations, 2. The method of claim 1, wherein said step of measuring said source pulse waveform at said measuring position includes placing a hydrophone in the water to measure said source pulse waveform.

3. The method of claim 1, wherein said step of convolving the adjusted measured source pulse waveform and the recorded waveforms comprises the step of convolving them as convolutions of first and second independent time functions, wherein said first independent time function is the time function of said source pulse waveform.

4. The method of claim 3, wherein said second independent time function is a time function of the impulse response of the geological formation.

5. The method of claim 1, wherein the geological formation is located substantially in the far field of the source pulse, and wherein said measuring position for measuring said source pulse waveform is located outside the far field of said source pulse.

6. The method of claim 1, wherein said step of determining a phase spectrum error comprises determining a phase error caused by a ghost pulse reflected from said surface of said body of water.

7. The method of claim 1, wherein said source is composed of multiple elements, and wherein the distance between said measuring position and said source is substantially greater than the distance between any of the elements and the geometric centroid of the source.

8. A method of determining a phase spectrum corrected seismic exploration waveform for convolution with recorded seismic waveforms reflected from subsurface formations as a result of a seismic exploration acoustic wave emitted into a body of water from an acoustic source in the body of water, comprising the steps of:
   determining a position of the acoustic source in the body of water;
   providing means in the body of water for measuring acoustic waveforms in the body of water as a result of acoustic waves from the source, wherein said measured waveforms comprise an uncorrected waveform having an uncorrected phase spectrum for the acoustic wave;
   determining a position of said acoustic waveform measuring means in the body of water;
   determining a difference between a far field waveform phase spectrum and said uncorrected phase spectrum of said measured uncorrected waveform based on said position of the acoustic source in the body of water and said position of said acoustic waveform measuring means in the body of water according to the equation:

$$A_{PSE}(0,0,f) = \arccos\left[\frac{\left(\frac{d}{R}\right)\cos\left(\frac{2\pi fd}{v}\right)}{\sqrt{\left(\frac{d}{R}\right)^2 \cos^2\left(\frac{2\pi fd}{v}\right) + \sin^2\left(\frac{2\pi fd}{v}\right)}}\right].$$

$$\text{sgn}\left[\sin\left(\frac{2\pi fd}{v}\right)\right] - \arcsin\left\{\text{sgn}\left[\sin\left(\frac{2\pi fd}{v}\right)\right]\right\}$$

where $A_{PSE}$ (0,0,f) is said phase difference, d is said acoustic source distance from said reflective upper boundary, R is said distance of said measuring position from said reflective upper boundary, and f is the frequency and v the velocity of the downgoing acoustic pulse; and removing said determined phase spectrum difference from said uncorrected phase spectrum of said measured waveform to correct the phase spectrum of the seismic exploration waveform: and forming a display of the phase spectrum corrected seismic exploration waveform.

9. The method of claim 8, wherein said means for measuring acoustic waveforms is a hydrophone.

10. The method of claim 9, wherein said hydrophone is located substantially beneath the geometric centroid of the source.

11. The method of claim 10, wherein said hydrophone is located outside the far field of said emitted acoustic wave.

12. The method of claim 8, wherein said step of determining a difference between said far field waveform phase spectrum and said measured uncorrected phase spectrum comprises removing the effects of a reflected ghost wave from an upper surface of the body of water from the measured source pulse waveform.

13. The method of claim 8, wherein the acoustic source includes multiple elements, and wherein the distance between said acoustic waveform measuring means and the source is substantially greater than the distance between any of said elements and the geometric centroid of the acoustic source.

14. The method of claim 8, wherein said step of determining a difference between said far field waveform phase spectrum and said uncorrected phase spectrum of said measured uncorrected waveform is performed based on the ratio of a distance of said acoustic source from a reflective upper boundary of the body of water to a distance of said acoustic waveform measuring means from said reflective upper boundary.

15. A method of seismically exploring a geological formation beneath a body of water, comprising the steps of:

emitting a pulse from a multiple element source into the body of water towards the geological formation to produce reflected pulses from within the geological formation;

determining a source depth position of said source relative to an upper surface of said body of water;

measuring a waveform of said source pulse at a measuring position in the body of water;

said measuring position being a distance from the source substantially greater than the distance between any of the elements of the source and the geometric centroid of the source;

recording waveforms of pulses reflected from the geological formation;

adjusting said measured source pulse waveform to compensate for phase errors therein, wherein said step of adjusting includes the steps of:

determining a phase spectrum error based upon said source depth position and the distance between said source pulse waveform measuring position and said source depth position; and subtracting the determined phase spectrum error from said source pulse waveform measured at the measuring position; and convolving the adjusted measured source pulse waveform with the recorded waveforms reflected from the geological formation; and forming a corrected display of the waveforms from the geological formations.

16. A method of determining a phase spectrum corrected seismic exploration waveform for convolution with recorded seismic waveforms reflected from subsurface formations as a result of a seismic exploration acoustic wave emitted into a body of water from a multiple element acoustic source in the body of water, comprising the steps of:

determining a position of the acoustic source in the body of water;

providing means in the body of water for measuring acoustic waveforms in the body of water as a result of acoustic waves from the source, wherein said measured waveforms comprise an uncorrected waveform having an uncorrected phase spectrum for the acoustic wave;

determining a position of said acoustic waveform measuring means in the body of water;

said distance between said acoustic waveform measuring means and the source being substantially greater than the distance between any of said acoustic source elements and the geometric centroid of the acoustic source;

determining a difference between a far field waveform phase spectrum and said uncorrected phase spectrum of said measured uncorrected waveform based on said position of the acoustic source in the body of water and said position of said acoustic waveform measuring means in the body of water;

removing said determined phase spectrum difference from said uncorrected phase spectrum of said measured waveform to correct the phase spectrum of the seismic exploration waveform; and forming a display of the phase spectrum corrected seismic exploration waveform.

* * * * *